(12) United States Patent
Le Saint et al.

(10) Patent No.: US 7,278,208 B2
(45) Date of Patent: Oct. 9, 2007

(54) METHOD OF REPLACING AN ABRADABLE PORTION ON THE CASING ON A TURBOJET FAN

(75) Inventors: Jacques Le Saint, Garancieres (FR); Alain Verrieres, Montrouge (FR); Francois Ponsen, Nandy (FR); Yannik Hamel, Palaiseau (FR)

(73) Assignee: Snecma Services, Paris (FR)

(*) Notice: Subject to any disclaimer, the term of this patent is extended or adjusted under 35 U.S.C. 154(b) by 532 days.

(21) Appl. No.: 10/709,211

(22) Filed: Apr. 21, 2004

(65) Prior Publication Data

US 2004/0231155 A1 Nov. 25, 2004

(30) Foreign Application Priority Data

Apr. 22, 2003 (FR) .................................. 03 04906

(51) Int. Cl.
*B23P 6/00* (2006.01)

(52) U.S. Cl. ............... 29/889.1; 29/402.02; 29/402.07; 29/402.08; 29/402.09; 29/407.01

(58) Field of Classification Search ............... 29/889.1, 29/889.2, 889.21, 402.02, 402.07, 402.08, 29/402.12, 407.01, 401.1, 402.09
See application file for complete search history.

(56) References Cited

U.S. PATENT DOCUMENTS

| 4,460,185 | A | * | 7/1984 | Grandey ..................... 277/415 |
| 4,536,127 | A | * | 8/1985 | Rossmann et al. ....... 415/173.4 |
| 5,451,351 | A | | 9/1995 | Blackmore |
| 5,655,701 | A | * | 8/1997 | Quattrocchi et al. ........ 228/119 |
| 5,735,045 | A | * | 4/1998 | Papayoti ..................... 29/889.1 |

\* cited by examiner

*Primary Examiner*—Essama Omgba
(74) *Attorney, Agent, or Firm*—Oblon, Spivak, McClelland, Maier & Neustadt, P.C.

(57) ABSTRACT

A simple and low cost method of replacing an abradable portion on the fan casing of a turbojet includes an inside heating belt together with holding sectors therefor are put into place against the abradable portion, each holding sector including an inflatable bladder, and the abradable portion and the inside heating belt being sandwiched in full between the fan casing and the bladders, the holding sectors themselves being held in place by a plurality of straps attached to the fan casing by fixing points.

7 Claims, 3 Drawing Sheets

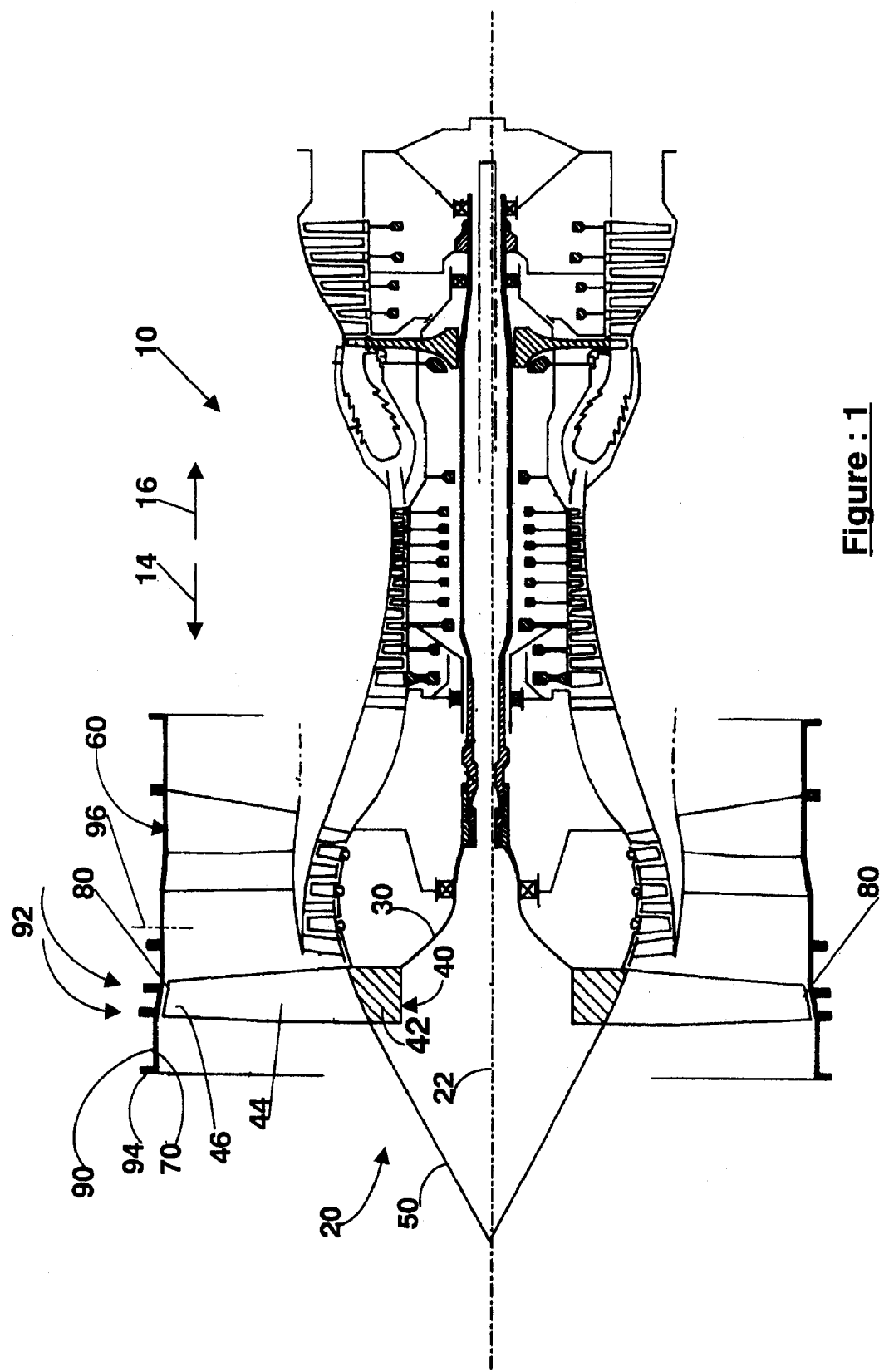
Figure : 1

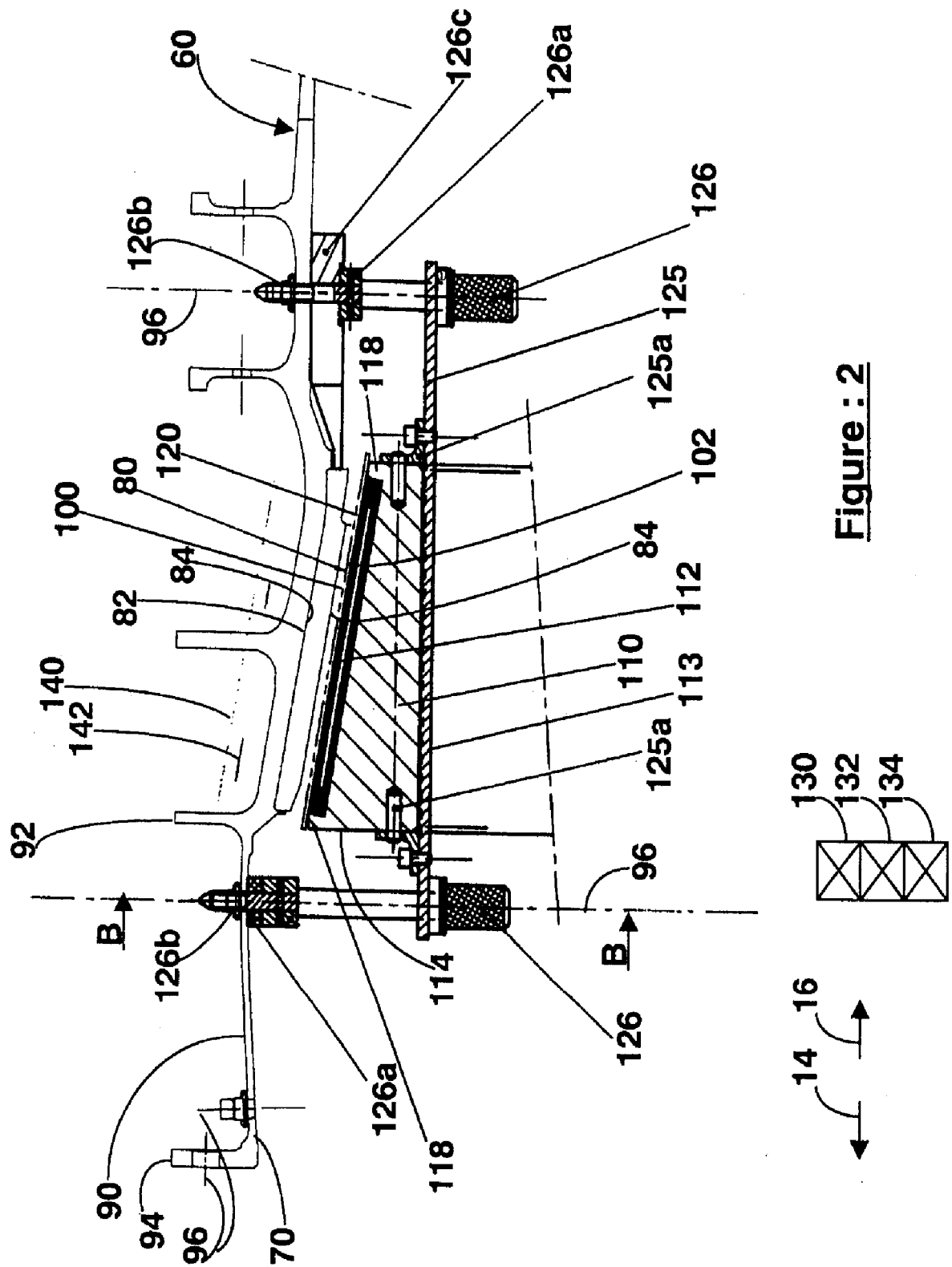
Figure : 2

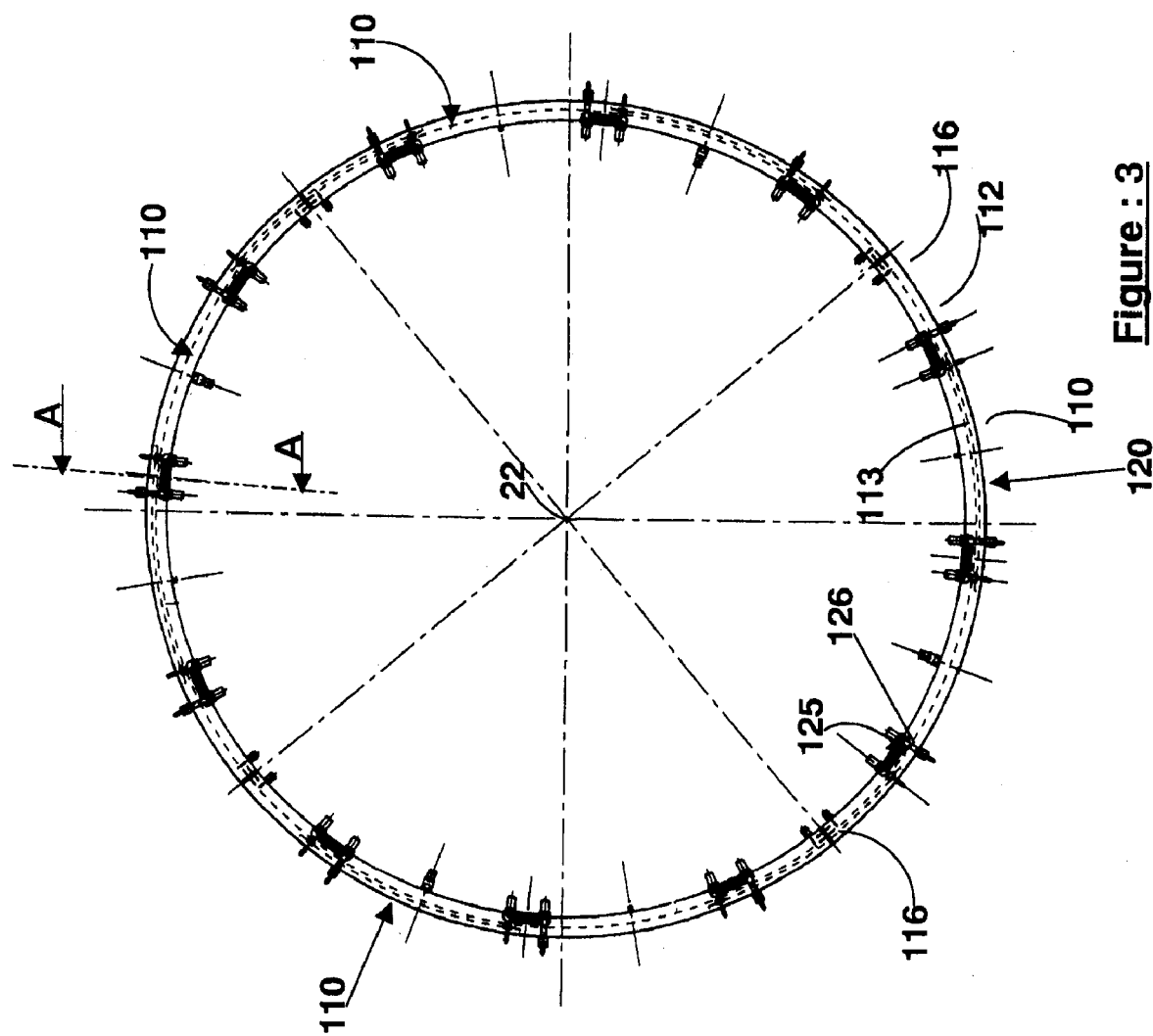
Figure : 3

METHOD OF REPLACING AN ABRADABLE PORTION ON THE CASING ON A TURBOJET FAN

TECHNICAL FIELD OF THE INVENTION

The invention relates to maintaining turbojets, and more particularly to a method of replacing a damaged abradable portion on the casing of the fan of such a turbojet.

STATE OF THE ART AND PROBLEM TO BE SOLVED

An abradable portion on the casing of a turbojet fan is normally replaced by performing the following methods:

1) removing the air inlet cone and the fan stage; 2) mechanically eliminating the damaged abradable portion; 3) preparing surfaces to receive adhesive; 4) bonding a new abradable portion against the casing by the "vacuum bag" technique for bonding composite materials together, which technique consists in covering the abradable portion by a flexible vacuum pouch or "bag" extending between sealing gaskets engaging the casing, the space between the abradable strip and the flexible film being filled with a pumping fabric and the entire system being connected to a source of suction, with heat being delivered by hot air or by means of an electrical heating belt in order to impart the thermal cycle needed by the adhesive; 5) cooling, removing the pumping fabric, removing the bag, the gaskets, etc.; and 6) machining the new abradable portion with a special tool fitted directly on the disk of the assembled fan.

That technology is acceptable with small casings, but it becomes lengthy and difficult with the casings of large turbojets, where such casings nowadays have a diameter of as much as 3 meters. It becomes very difficult to put the vacuum bag into place and to provide leaktightness at the gasket between the flexible film and the casing, since:

the gaskets are very long compared with the volume between the flexible film and the casing;

numerous fixing holes in the casing need to be sealed off thoroughly, with these holes serving to enable sound-absorbing panels for the engine to be attached to the casing by means of screws;

putting the vacuum bag into place becomes dangerous; and obtaining a vacuum inside said bag requires numerous precautions to be taken, together with special means that are expensive and difficult to implement.

That technology also presents the drawback of pressing the abradable portion against the casing with relatively low pressure only, said compression being differential between atmospheric pressure and the relative vacuum obtained inside the vacuum bag.

Another difficulty presented by that technology is controlling the temperature to which the adhesive is raised, since heat losses are large, both by conduction through the material of the casing and by convection to ambient air, with such heat losses becoming very large with large casings.

A first problem to be solyed is to propose a simple and low cost method of replacing an abradable portion on the casing of a turbojet fan in position under the wing of the airplane, and in which the size of the casing is not a handicap.

A second problem to be solyed is to control the entire cycle of adhesive polymerization.

SUMMARY OF THE INVENTION

The invention provides a method of replacing an abradable portion on the casing of a turbojet fan, the turbojet having a rotary portion, this rotary portion itself comprising a shaft having a fan stage attached to its front end, the fan stage itself comprising a hub supporting a plurality of blades, the turbojet also comprising an annular fan casing surrounding the fan stage, said fan casing comprising an inside wall against which a likewise annular abradable portion is bonded, the bonding surfaces of the abradable portion and of the fan casing, the surface of the abradable portion opposite from its bonding surface being referred to as its "sealing" surface, the fan casing having a plurality of fixing points, the fan stage having previously been removed, the method comprises the following operations:

a) removing the worn abradable portion; b) preparing a new abradable portion; c) applying adhesive to the bonding surfaces of the abradable portion and of the fan casing, said bonding surfaces having previously been cleaned; d) applying the abradable portion against the inside wall of the fan casing; e) putting an "inside" heating belt into place against the sealing surface of the abradable portion, the inside heating belt completely covering the abradable portion; f) putting holding sectors into place against the inside heating belt, each holding sector including an inflatable bladder, the abradable portion and the inside heating belt being sandwiched in full between the fan casing and the bladders, the holding sectors themselves being held in place by a plurality of straps attached to the fan casing by the fixing pints; g) connecting the bladders to a common source of air under pressure and connecting the inside heating belt to a regulated electrical power supply, pressurizing the bladders, and heating the adhesive in application of a cycle of temperature and pressure conditions that is adapted to the adhesive used and to the thermal conductivity of the fan casing; and h) cooling and removing the holding sectors and the inside heating belt.

It will be understood that by using holding sectors and bladders over the heating belt it is possible to put into place progressively the means for compressing the abradable portion that is for bonding to the casing and for heating the adhesive and the surfaces that are to be bonded together. The surfaces are bonded together at ambient temperature and do not require sealing means to be put into place. The holding sectors fitted with their bladders are put into place separately, one after another. This operation is therefore simple, inexpensive, and easy to implement, even with large turbojets, thereby solving the first problem.

Advantageously, the fan casing including an outer wall, at least one "outside" heating belt is placed against the outside wall in register with the abradable portion, the outside heating belt extending right around the fan casing and thus surrounding the abradable portion, said outside heating belt being connected to an electrical power supply and being heated during the thermal cycle.

It will be understood that the outside heating belt delivers heat to the adhesive and to the surface for bonding through the casing, i.e. through the outside wall of the casing towards the inner wall. This heating thus opposes any heat loss in the opposite direction and consequently provides better control over the temperature of the adhesive and the surfaces for bonding together, thereby solving the second problem.

This method thus makes it possible to act on a turbojet while it is mounted on an airplane, i.e. under the wing of the airplane, and regardless of external temperature conditions. This method is clearly also applicable to engines that have been removed.

DESCRIPTION OF THE FIGURES

The invention will be better understood and the advantages it provides will appear more clearly in the light of a detailed embodiment and the associated figures.

FIG. 1 shows a double-flow turbojet in section view on AA of FIG. 3.

FIG. 2 shows the abradable portion being bonded into place in a section view likewise on AA of FIG. 3.

FIG. 3 shows the circle formed by four holding sectors together with their straps and bolts, as seen looking along BB in FIG. 2.

DETAILED DESCRIPTION

Reference is made initially simultaneously to FIGS. 1 and 2. For reasons of clarity, the front of the turbojet 10 is referenced 14 and the rear of the turbojet 10 is referenced 16. The turbojet 10 is of the double-flow type and comprises a rotary portion 20 of axis 22 comprising in particular a shaft 30 and a fan stage 40 attached via its hub 42 to the front of the shaft 30, the hub 42 supporting a plurality of blades 44 with the portion of each blade that is furthest from the hub 42 being referred to as its tip 46. The rotary portion 20 also comprises an air inlet cone 50 attached to the front 14 of the hub 42.

At its front end 14, the turbojet 10 also includes an annular fan casing 60 surrounding the fan stage 40 and open to the front 14. The fan casing 60 is stationary, being centered on the axis 22 and being substantially cylindrical in shape. The fan casing 60 comprises an inside wall 70 against which an annular abradable portion 80 surrounding the blades 44 is bonded, said abradable portion cooperating with the tips 46 of the blades 44 to leave small clearance. References 82 and 86 designate respectively the bonding surface of the abradable portion 80 and the bonding surface of the inside wall 70. Reference 84 designates the sealing surface of the abradable portion 80 facing the tips 46 of the blades 44, the sealing surface 84 consequently being opposite from the bonding surface 82 of the abradable portion 80.

The fan casing 60 also has an outside wall 90 on which there are conventionally placed projecting annular reinforcing hoops 92, this annular reinforcement 92 being disposed in particular in register with the abradable portion 80, and thus with the blades 44, so as to reinforce the casing of the fan 40 locally in the event of a blade 44 breaking. At the front 44, the fan casing 60 also includes an annular front flange 94 to which the pod (not shown) surrounding the turbojet 10 is attached. The fan casing 60 also includes a plurality of fixing points 96 conventionally constituted by projections pierced by through tapped holes, these fixing points 96 being formed in the front flange 94 and in the outside wall 90 as a function of the dispositions of the elements that are to be attached to the fan casing 60.

Reference is now made simultaneously to FIGS. 2 and 3 for describing the method of repairing the abradable portion 80 of the fan casing 60, the turbojet being either attached to the wing of the airplane, or else disposed horizontally on a cradle (not shown). The repair method comprises the following operations:

1) Removing the front air inlet cone 50, this cone conventionally being screwed to the annular flange (not shown) at the front 14 of the rear cone 42 of the fan stage 40.

2) Removing the rear cone of the fan stage 40, which cone is conventionally screwed to an annular flange (not shown) at the front 14 of the disk of the fan 40.

3) Removing the fan blades.

4) Removing the front and rear sound-damping panels.

The abradable portion is now accessible from the front 14 of the fan casing 60.

5) Removing the worn abradable portion 80, either by using portable pneumatic or electropneumatic mechanical means, or else directly by using a portable grinder mounted on the fan stage 40.

6) Preparing the strip of new abradable portion 80.

7) Sanding and cleaning the abradable portion 80 and the bonding surfaces 86 of the fan casing 60 and applying adhesive to the bonding surface 86 of the fan casing 60. It should be observed that this sanding and this cleaning should be performed no more than two or three hours prior to applying the adhesive, since the surfaces for bonding together must be scrupulously cleaned and deoxidized.

8) Putting the abradable portion 80 into place against the inside wall 70 of the fan casing 60, the bonding surfaces 82 and 86 being placed one against the other. During this operation, any bubbles of air are eliminated together with excess adhesive by tapping the abradable portion 80 with a mallet against the inside wall 70 and by using a spatula to remove the adhesive that goes beyond the abradable portion 80. During this step, it can be convenient to hold the abradable portion 80 in place against the inside wall 70 by using adhesive strips.

9) Putting an "inside" heating belt 100 into place against the sealing surface 84 of the abradable portion 80, the internal heating belt 100 covering the abradable portion 80 completely. The internal heating belt 100 is preferably constituted by a thin and flexible strip having the same shape as the abradable portion 100 that is to be covered, said strip carrying an electrical heater resistance element that is regularly distributed over its surface area, the inside heating belt 100 covering the entire circumference of the abradable portion 80 so as to ensure that it is heated uniformly. In order to obtain better control over bonding temperature, the inside heating belt 100 includes at least one internal temperature probe 102 for regulation purposes.

10) Putting rigid holding sectors 110 and bladders 120 into place against the inside heating belt 100, the stack constituted successively by the abradable portion 80, the internal heating belt 100, and the bladders 120 being sandwiched in full between the fan casing 60 and the holding sectors 110, where the term "in full" is used to mean over the entire circumference of the abradable portion 80. The holding sectors 110 are themselves held in place by a plurality of straps 125 held to the fan casing 60 at the fixing points 96 by means of bolts 126. In practice, the operator begins by putting the topmost sector into place followed by the lateral sectors so that, during assembly, the lateral sectors can be pressed against sectors that have already been put into place. The shape of the straps 125 can vary very widely and matches the shape of the fan casing 60 at the locations of the fixing points 96 of said casing. This disposition is well adapted to large casings, since each holding sector 110 can be put into place and fixed to the casing separately. These holding sectors are preferably three in number so as to limit the operations of putting them into place. When the casing is of large diameter, the holding sectors may be more numerous, i.e. smaller and lighter in weight so as to make them easier to handle. Once all of the holding sectors 110 have been assembled, they form a circumference with clearance between its ends 116 that is just sufficient to allow the sectors to be put into place and removed.

More precisely, each holding sector 110 is generally in the form of a circular arc and the references 112, 113, 114, and 116 are used respectively to designate the convex surface, the concave surface opposite to the convex surface 112, the lateral faces, and the ends. Each holding sector 110 has its convex surface 112 pressing a bladder 120 against the internal heating belt 100 and the abradable portion 80. The holding sectors 110 also comprise cheeks 118 extending their lateral surfaces 114, these cheeks 118 projecting from the convex surface 112 and holding captive in a lateral direction the bladders 120 that are disposed against the convex surface 112.

Still more precisely, the straps 125 are attached to the holding sectors 110 by a set of brackets, bolts, and pins 125a, the straps 125 themselves being attached to the casing 120 by the bolts 126, thickness spacers 126a, and nuts 126b, the casing 60 being clamped to the fixing points 96 that are used between the thickness spacers 126a and the nuts 126b. The bolts 126 at the rear 16 of the holding sectors 110 are fitted radially in abutments 126c that press against the rear 16 of the abradable portion 80, the bonding surface 86 forming an imprint in the inside wall 70 that restricts movement of the abradable portion 80 towards the front 14 or towards the rear 16. Inflating the bladders 120 applies a forwardly-directed force on the holding sectors 110 that tends to expel them towards the front 14. In order to prevent the holding sectors 110 being expelled, this force is taken up in succession by the pins 125a, the straps 125, the bolts 126 received in the abutments 126c, and the abradable portion 80 in the bonding surface 86 that forms an imprint in the casing 60.

11) Placing at least one "outside" heating belt 140 on the outside wall 90 in register with the abradable portion 80, the outside heating belt 140 being placed all around the fan casing 60 and thus surrounding the abradable portion 80. Also placing between the outside heating belt 140 and the outside wall 90 of the casing 60, at least one temperature probe. The outside heating belt 140 can be held against the casing 60 by adhesive strips. When annular reinforcing hoops 92 are present in register with the abradable portion 80, a plurality of outside heating belts 140 are placed beside and between the annular hoops 92 so as to ensure the entire abradable portion 80 is thoroughly covered.

12) Connecting the bladders to a common source 130 of air at a regulated pressure, this source 130 of air pressure being common so as to ensure that all the bladders are inflated with identical pressure. The inside heating belts 100 and the outside heating belts 140 are also connected to an electrical power supply 132. Finally, the inside and outside temperature probes 102 and 142 are connected to means for measuring and regulating temperature.

13) Applying pressure to the bladders 120 and implementing a thermal cycle that is appropriate to the adhesive used. In this example, the adhesive used is sold under the trade name RTV 147A/147B, and the bladders 120 are inflated to a pressure of 1 bar, with the adhesive and the bonding surfaces 82 and 86 being raised to a temperature lying in the range 105° C. to 130° C. for a period of 2 hours.

14) Cooling, deflating the bladders, disconnecting and removing the holding sectors 110, the bladders 120, the heating belts 100, 140, and the temperature probes 102, 142.

15) Machining the sealing surface 84 of the abradable portion 80 using a grinder attached to the shaft 30, with rotation of the grinder attached to the shaft 30 enabling the sealing surface 84 to be given a shape that is accurately circular and centered on the axis 22.

The pressure exerted by the bladders on the abradable portion for bonding is taken up:
by the straps 125 connected to the bladder support; and
by the bolts 126 attaching them to the casing.

When the bladders 120 are put under pressure, they come into end-to-end contact so as to form a continuous circumference against the abradable portion 80 that is to be bonded into place. Measurements have been performed that show that the drop in the pressure exerted by the bladders 120 on the abradable portion 80 remains less than 10% in register with the line of contact between two adjacent bladders, which remains acceptable. It should be observed that the cheeks 118 enable the bladders 120 to be contained between the holding sectors 110 and the abradable portion while the bladders are under pressure.

The inside heating belt 102 is sufficient for heating the adhesive, however heat losses via the material of the casing 60 and to the ambient air around the casing (when working outdoors—e.g. under the wing of the airplane) make adjusting the bonding temperature problematic. That is why the inventors prefer to place around the casing 60 a second source of heat in the form of one or more outside heating belts 140 depending on the configuration of the casing 60 and the presence and the disposition of the annular reinforcing hoops 92. Thus, simultaneously monitoring the temperature of the inside heating belt 100 and the temperature of the outside heating belt 140 makes it possible to achieve effective control over the temperature of the adhesive in the space situated between the inside heating belt 100 and the outside heating belt 140.

For example, in order to perform bonding at a temperature of 85° C. as is required for an adhesive sold under the trade mark RTV 147A, the temperature of the inside heating belt 100 measured with the inside temperature probes 102 is regulated at 120° C., while the temperature of the outside heating belt 140 as measured with the outside temperature probes 142 is regulated at 90° C., it being necessary to determine these two temperatures experimentally for each model of casing. It should be observed that the main part of the heat required for polymerization is delivered by the inside heating belt 100 and that the outside heating belt 140 acts rather as an auxiliary.

The invention claimed is:

1. A method of replacing an abradable portion on the casing of a turbojet fan, the turbojet including a rotary portion, the rotary portion comprising a shaft including a fan stage attached to its front end, the fan stage comprising a hub supporting a plurality of blades, the turbojet also comprising an annular fan casing surrounding the fan stage, said fan casing comprising an inside wall against which a likewise annular abradable portion is bonded, the surface of the abradable portion opposite from its bonding surface being referred to as its sealing surface, the fan casing including a plurality of fixing points, the fan stage having previously been removed, the method comprising:
   a) removing a worn abradable portion;
   b) preparing a new abradable portion;
   c) applying adhesive to the bonding surfaces of the new abradable portion and of the fan casing, said bonding surfaces having previously been cleaned;
   d) applying the abradable portion against the inside wall of the new fan casing;
   e) putting an inside heating belt into place against the sealing surface of the new abradable portion, the inside heating belt completely covering the new abradable portion;
   f) putting holding sectors into place against the inside heating belt, each holding sector including an inflatable bladder, the new abradable portion and the inside heating belt being sandwiched in full between the fan casing and the bladders, the holding sectors themselves being held in place by a plurality of straps attached to the fan casing by the fixing points;

g) connecting the bladders to a common source of air under pressure and connecting the inside heating belt to a regulated electrical power supply, pressurizing the bladders, and heating the adhesive in application of a cycle of temperature and pressure conditions that is adapted to the adhesive used and to the thermal conductivity of the fan casing; and h) cooling and removing the holding sectors and the inside heating belt.

2. A method according to claim 1, wherein the number of holding sectors is not less than three.

3. A method according to claim 1, wherein, during the thermal cycle, the temperature of the adhesive is monitored by means of at least one inside temperature probe placed inside the inside heating belt, the inside temperature probe being connected to means for measuring and regulating temperature.

4. A method according to claim 1, the fan casing including an outside wall, wherein at least one outside heating belt is placed against the outside wall in register with the abradable portion, the outside heating belt extending right around the fan casing and thus surrounding the abradable portion, said outside heating belt being connected to an electrical power supply and being heated during the thermal cycle.

5. A method according to claim 4, wherein, during the thermal cycle, the temperature of adhesive is also controlled using at least one outside temperature probe disposed against the outside heating belt, the outside temperature probe being connected to the temperature measuring means.

6. A method according to claim 1, wherein the sealing surface of the abradable portion is subsequently machined.

7. A method according to claim 1, wherein the new abradable portion is machined using a grinder attached to the shaft.

* * * * *